United States Patent
ElHage

(10) Patent No.: US 9,516,866 B2
(45) Date of Patent: Dec. 13, 2016

(54) MARINE CONTAINMENT DEVICE

(71) Applicant: Allie ElHage, Sarasota, FL (US)

(72) Inventor: Allie ElHage, Sarasota, FL (US)

( * ) Notice: Subject to any disclaimer, the term of this patent is extended or adjusted under 35 U.S.C. 154(b) by 0 days.

(21) Appl. No.: 14/091,366

(22) Filed: Nov. 27, 2013

(65) Prior Publication Data

US 2015/0144067 A1 May 28, 2015
US 2016/0150765 A9 Jun. 2, 2016

Related U.S. Application Data

(60) Provisional application No. 61/797,020, filed on Nov. 27, 2012.

(51) Int. Cl.
*A01K 63/02* (2006.01)
*A01K 63/00* (2006.01)

(52) U.S. Cl.
CPC ............ *A01K 63/02* (2013.01); *A01K 63/00* (2013.01)

(58) Field of Classification Search
CPC ........ A01K 63/02; A01K 69/00; A01K 69/06; A01K 69/08
USPC .................. 119/203; 43/60, 65, 100, 104
See application file for complete search history.

(56) References Cited

U.S. PATENT DOCUMENTS

| | | | | |
|---|---|---|---|---|
| 2,688,817 | A * | 9/1954 | Brune | 43/56 |
| 4,399,629 | A * | 8/1983 | Duncan | 43/4 |
| 4,965,955 | A * | 10/1990 | Campbell et al. | 43/4 |
| 2012/0102811 | A1 * | 5/2012 | Waugh | 43/6 |

OTHER PUBLICATIONS

Zoo Keeper Vimeo Video, Turtle & Ray Productions. Nov. 1, 2011. Available at http://vimeo.com/31425377.*

* cited by examiner

*Primary Examiner* — Kristen Matter

(57) ABSTRACT

A marine containment device is disclosed for containing a marine species. The device includes a body having a first end and a second end. An entry is in the first end for defining an open position and a closed position. The open position is created by a spearing device with a marine species pushing against the entry and allowing the marine species into the body. The closed position is created by the spearing device removing the spearing device from the body and stripping the marine species off the spearing device. A displacement drain is in the second end for displacing the water within the body during the open position and minimizing displacement of the water through the entry. A travel distance is in the displacement drain for offsetting the exiting water from the body and prohibiting protrusion of the marine species from the body.

14 Claims, 9 Drawing Sheets

MARINE CONTAINMENT DEVICE

CROSS REFERENCE TO RELATED APPLICATIONS

This application claims benefit of Applicant's prior U.S. Provisional Patent Application No. 61/797,020, filed on Nov. 27, 2012, Confirmation No. 6742, which is incorporated herein by reference.

FIELD OF THE INVENTION

Aspects of the invention relate generally to the marine specimen holding device, more specifically to a containment assembly appropriate for use in containing marine specimens, including the venomous species *Pterois Volitans* and *Pterois Miles*, commonly known as lionfish.

BACKGROUND OF THE INVENTION

*Pterois Volitans* and *Pterois Miles*, both commonly known in the Atlantic Ocean, Caribbean Sea and Gulf of Mexico as lionfish, are a venomous invasive species from the Indo Pacific and the Red Sea. The two visually identical species were introduced into the Atlantic via the US aquarium trade sometime in the early to mid 1980's. Their current invaded range is from North Carolina to South America, including all of the Gulf of Mexico. In less than five years, lionfish have established themselves throughout the Caribbean.

Lionfish may live longer than 15 years and reach sizes exceeding 19 inches in length. They inhabit all types of marine habitats and depths, seen at shorelines and at depths exceeding 1000 feet. Lionfish become sexually mature in less than one year and spawn in pairs. Reproduction occurs throughout the year, about every 4 to 5 days. In the Caribbean, a single female may spawn over 2 million eggs a year. The eggs are held together in a gelatinous mass and are dispersed at the ocean's surface by currents.

Lionfish are carnivores that prey on commercially, recreationally and ecologically important native species, and capable of consuming prey up to half its own body length. Lionfish are voracious predators known to eat native fish and crustaceans in large quantities, including both ecologically and economically important species like grunts, snapper, Nassau grouper, and cleaner shrimp. Studies show that dense lionfish populations can consume more than 460,000 prey fish per acre per year. In heavily invaded sites, they have reduced the native fish population by up to 90% and continue to consume native fish at unsustainable rates.

Due to the absence of natural predators in the invaded areas, lionfish densities have and are growing beyond sustainable levels. The primary means of controlling the lionfish population is through manual collection of the species by divers who target them. Lionfish are edible and in some areas considered a delicacy. Due to the lack of predators, close range capture is feasible. Most divers use a pole spear or a spearing device to capture the lionfish. Some use nets to capture them in protected sanctuaries that do not permit the use of a spearing device. However, due to the presence of the venomous spines on the lionfish and the risk of getting stung, actual physical contact by a diver with the lionfish should be avoided as much as possible.

Once a lionfish is speared, the diver must take caution not to get stung by the up to 18 venomous spines each lionfish possesses. In humans, the lionfish venom can cause intense throbbing, sharp pain, tingling sensations, sweatiness and blistering. In worst case scenarios the symptoms may include headache, nausea, abdominal pain, delirium, seizures, paralysis of limbs, changes in blood pressure, breathing difficulties, heart failure and tremors, pulmonary edema, and loss of consciousness. And therefore, it is important for divers to protect themselves from the spines while removing this invasive species from the reefs.

Throughout the invaded areas, divers use varying types of containment devices ranging from a mesh bag to a 5-gallon water bottle. When using the mesh bag, divers will spear the lionfish first. Then, while the lionfish is on the spear, most divers will cut the venomous spines with a pair of shears prior to inserting the lionfish inside the bag. This manner of containment is time consuming as well as labor intensive for the diver.

Another type of containment used is an adapted 5-gallon water jug. A hole is cut to allow a sliced funnel to be zip-tied to the container. This allows them to insert the lionfish into the container while the lionfish is on the spear, by pressing thru the funnel. The funnel will open while the lionfish is pushed through and close around the spear when the lionfish is fully inserted. When retracting the spear, the lionfish is removed from the spear by the closed funnel. The hard plastic material of the bottle protects the diver from the spines, yet carrying a 5-gallon jug while diving will create an excessive amount of drag, exerting energy from the diver, again time consuming and labor intensive.

SUMMARY OF THE INVENTION

The present invention includes a containment assembly used by divers to contain venomous and non-venomous marine species that may harm the diver comprising of multiple embodiments, more specifically, of a body made of a puncture resistant or puncture proof material, as it pertains to the spines of the marine species, a flange that attaches to both sides of the body of the invention and a cap used to hold either a one-way funnel entry or a water and air displacement draining valve to said flange. The invention also embodies loops molded into the flange that allows the divers to secure the invention to them during a dive. With the invention secured, the diver enters the water to commence the dive.

Once the invention contacts the sea, it will fill up with water, allowing the air to escape through the funnel entry and the safety valve on the rear. Once filled with water, the invention becomes slightly negative buoyant, thus allowing the diver to adjust their buoyancy as required and commence with the hunt for marine specimen. Once the specimen is found, the diver will spear it with the use of a spearing device.

With the speared specimen on the spearing device, the diver turns the spear with the specimen attached, so that the specimen can be pushed through the funnel entry of the invention. The action of pushing the specimen through the funnel will force the funnel to open and allow the specimen into the invention. This same action will also cause water from inside the invention to be displaced through the safety drain valve at the rear of the invention. This water displacement thru the rear will minimize the water displaced through the entry funnel, and the possibility of an already contained specimen "popping" out through the funnel. Once the specimen has passed through the funnel entry, the funnel will close around the spearing device. The action of removing the spearing device from the invention will bring the specimen into contact with the closed funnel and strip the specimen off the spearing device. With the specimen securely stowed inside the invention, the diver can move toward the next specimen.

BRIEF DESCRIPTION OF THE DRAWINGS

The above and other objects, features and advantages of the invention will become more apparent from the following description of certain preferred embodiments thereof, when taken in conjunction with the accompanying drawings in which.

DETAILED DESCRIPTION OF THE EMBODIMENTS OF THE INVENTION

The following detailed description of the invention, along with the accompanying drawings, will be thoroughly discussed so as to convey the scope of the invention to those skilled in the art. Like numbers refer to like elements throughout.

Figure 1:
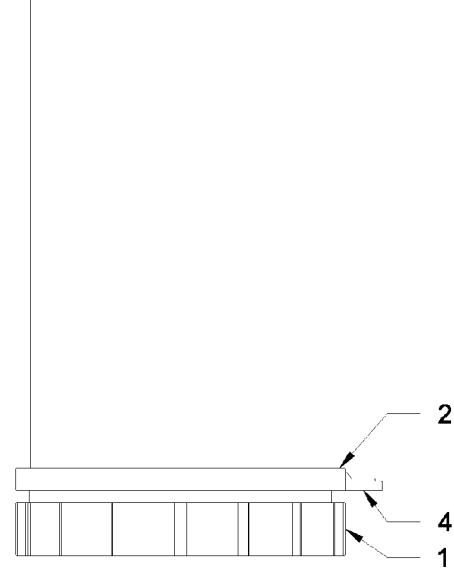
FIG. 1 depicts the side view of the assembled invention with preferred embodiments.
Figure 2:
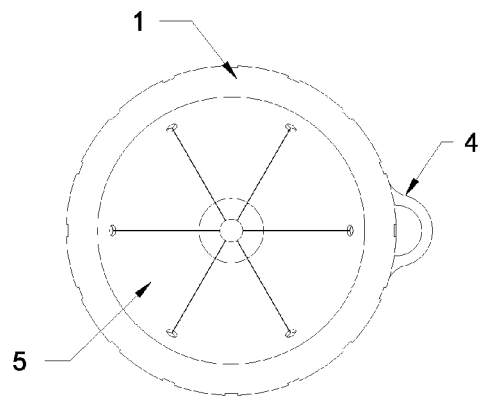
FIG. 2 depicts the top view of the assembled invention with preferred embodiments.
Figure 3:
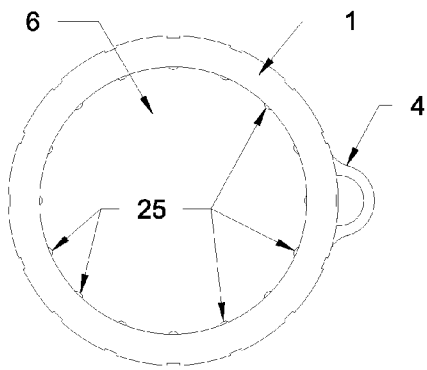
FIG. 3 depicts the bottom view of the assembled invention with preferred embodiments.

FIGS. 1, 2 and 3 shows the side view, top view and bottom view, respectively, of the invention as assembled and ready to use. Embodiments of the invention are shown, as: body 3, cap 1, flange 2, the flange loop 4, the funnel 5 and the safety valve 6.

The body 3 of the invention can be of various materials, such as plastics, metals and fabric, or a combination thereof, so long as these meet certain criteria for puncture resistance. The body can also be used to display product identity as well as product instruction and maintenance.

Figure 4:
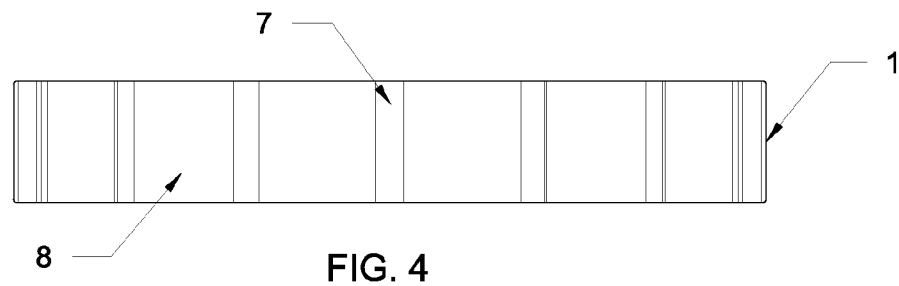
FIG. 4 depicts the side view of the threaded cap.
Figure 5:
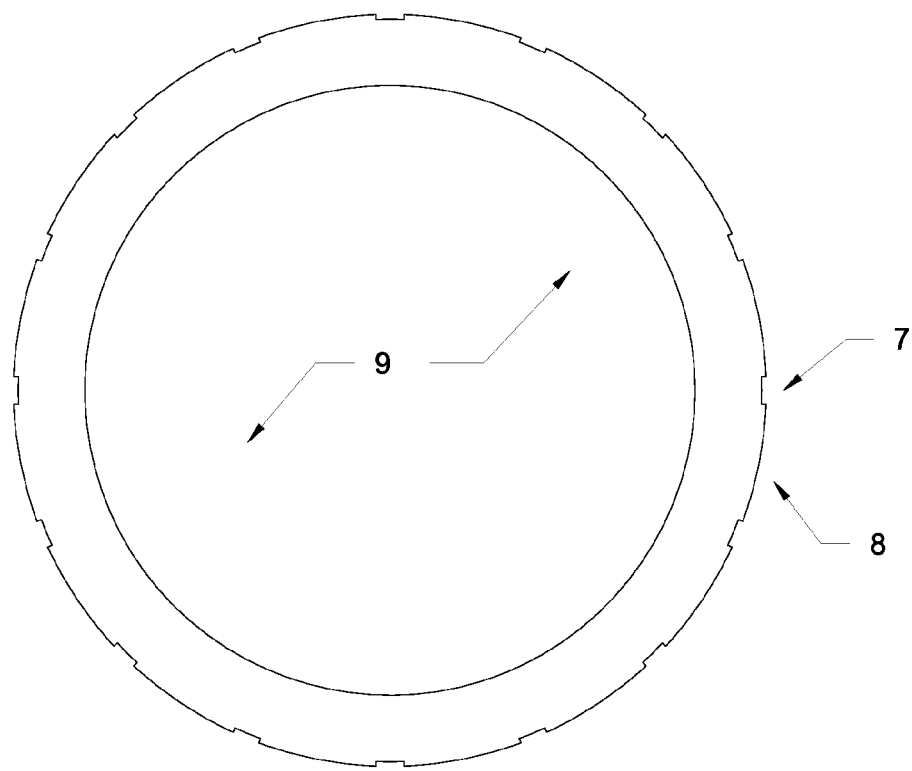
FIG. 5 depicts the top view of the threaded cap.
Figure 6:
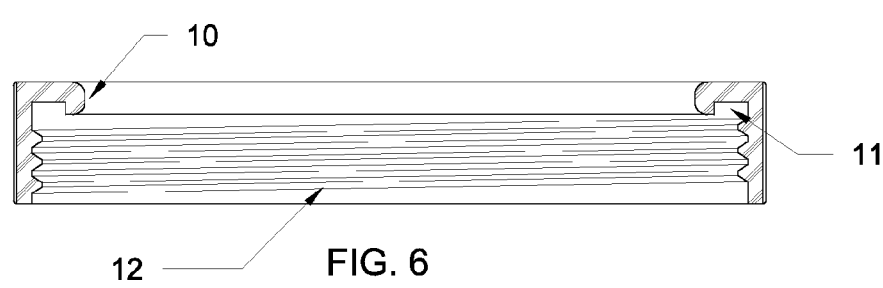
FIG. 6 depicts a section through the diameter of the threaded cap.

FIGS. 4, 5 and 6 show three views of the cap 1, respectively the side view, top view and a section through.

The cap 1 embodies certain design elements that allows the diver to easily place and remove the cap 1. The cap 1 has threads 12 on its interior to allow mating with the flange 2. Indents 7 on the outer face 8 of the cap 1 facilitate gripping the cap 1 to install and remove as required. The center 9 of the cap 1 is open. The inner rim 10 of the cap is rounded to maximize water and air flow from the safety valve 6. The funnel 5 and safety valve 6 sit inside the cap 1 in an indented portion 11 of the embodiment. This allows for the safety valve 6 and funnel 5 to "sit" correctly while the cap 1 is screwed on.

Figure 7:
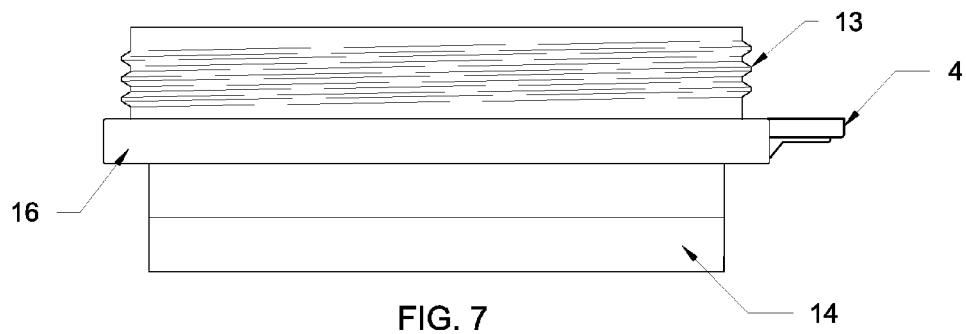
FIG. 7 depicts a side view of the threaded flange.
Figure 8:
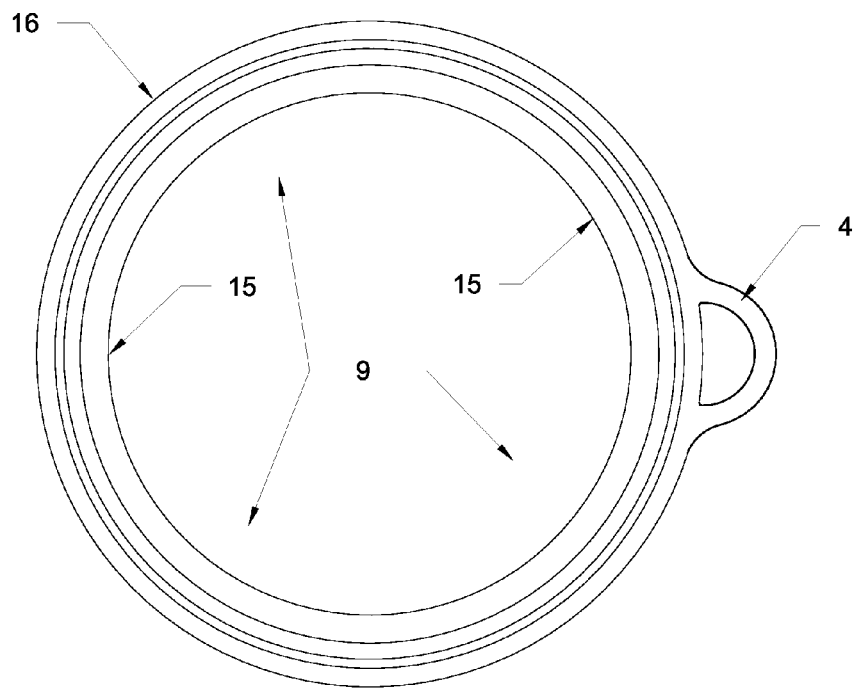
FIG. 8 depicts a top view of the threaded flange.
Figure 9:
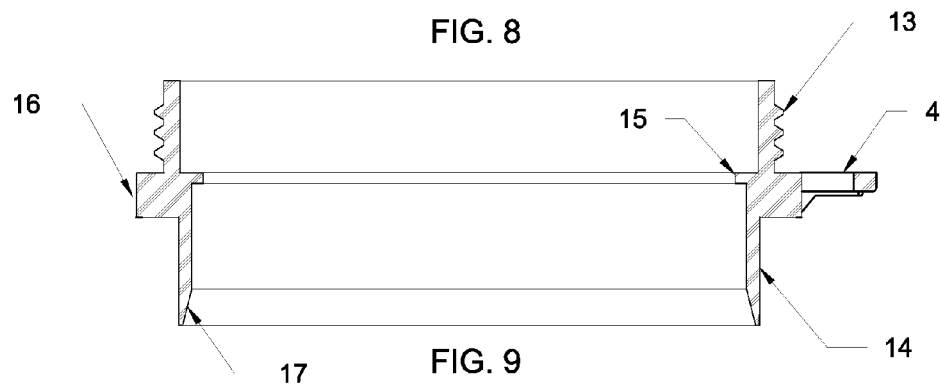
FIG. 9 depicts a section through view of the threaded flange.
Figure 10:
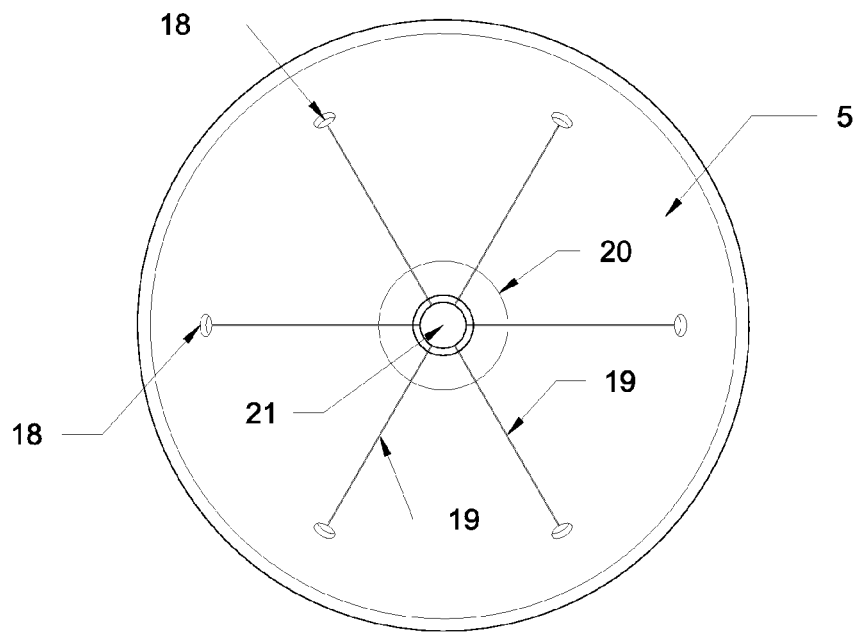
FIG. 10 depicts a top view of the entry funnel.

FIGS. 7, 8 and 9 show the top view, side view and section through the flange 2, respectively.

The loop extension 4 that is formed with the flange 2 is used to attach the invention to the diver, thus negating the need to drill holes for eye bolts or such in the body 3 of the invention. Drilling holes in the body 3 are a potential for spines to protrude and may cause harm to the diver. The threads 13 on the flange 2 allow the mating of the cap 1 to the flange 2. The flange extension 14 allows for securing the flange 2 to the body 1 through friction, adhesive, one or more fasteners such as screws, bolts, or rivets, and/or a combination thereof. The outer ring 16 of the flange 2 acts as a stop to where the body 3 comes to rest when inserting and attaching the flange 2. A preferred embodiment of the flange 2 is the inner ring 15. This ring 15, combined with the extension 24 on the safety valve 6, as will be shown later, forces water to travel at least two ninety degrees turns to exit the invention. This travel prohibits the spines of specimen placed in the invention to protrude from the invention.

FIGS. 10, 11, 12 and 13 show the top view, side view, bottom view and section thru the funnel 5, respectively.

Figure 11:
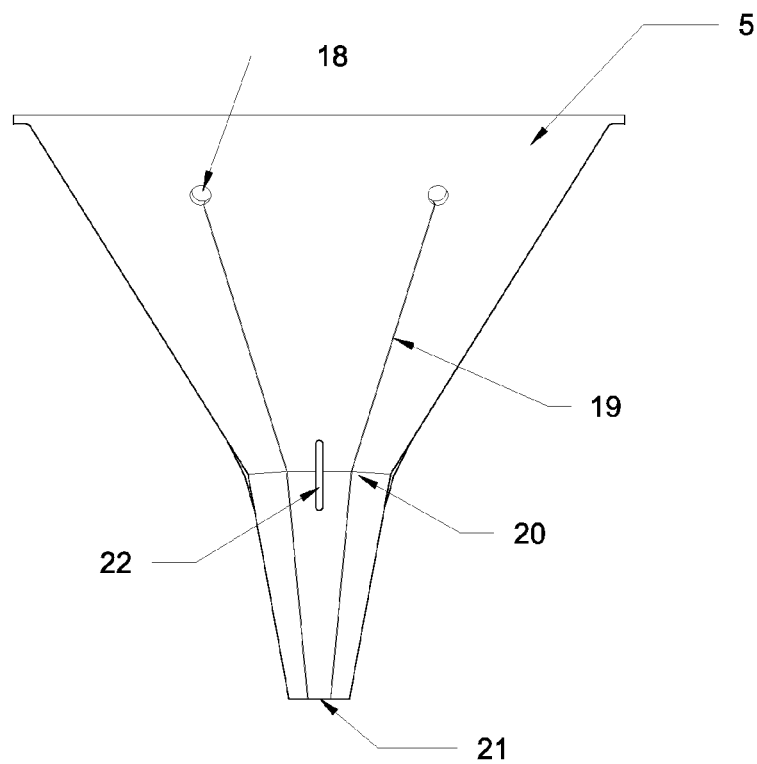
FIG. 11 depicts a side view of the entry funnel.
Figure 12:
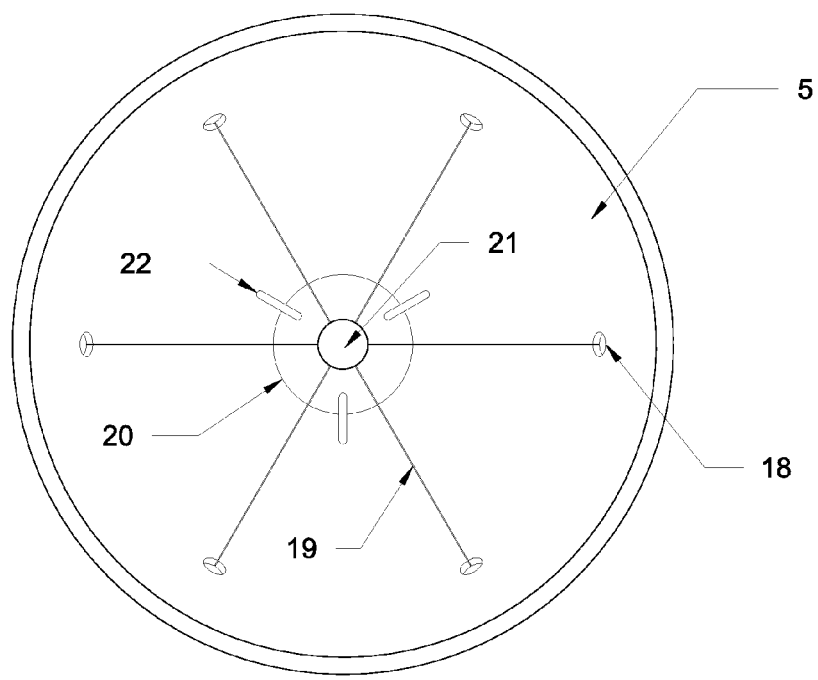
FIG. 12 depicts a bottom view of the entry funnel.
Figure 13:
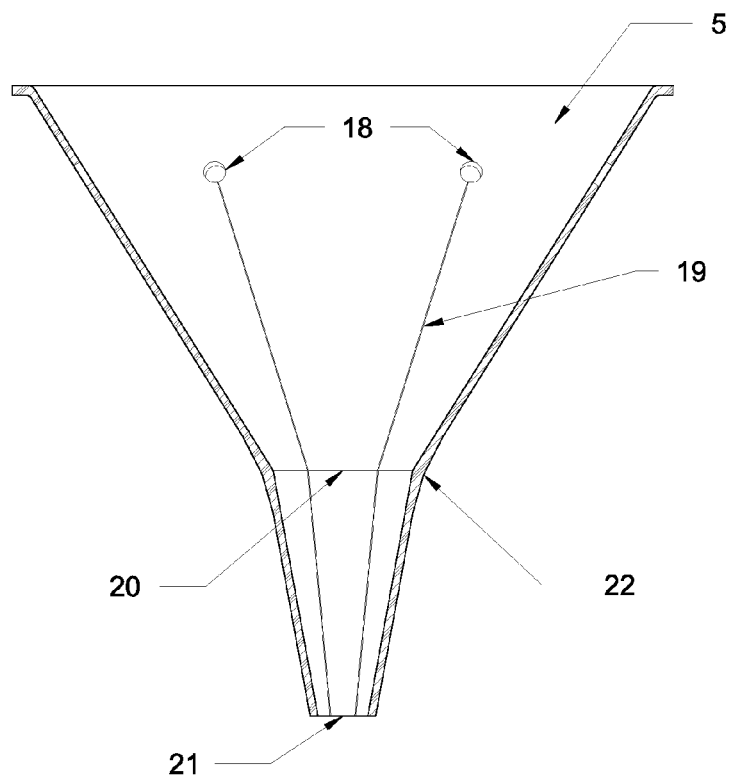
FIG. 13 depicts a section through view of the entry funnel.

The funnel 5 is shaped as a large cone with a wide opening at the top and angled towards a small opening 21 at the bottom. The angle changes at the neck 20 of the funnel 5. The top of the funnel 5 is a diameter that allows the funnel 5 to "sit" in the cap 1 when assembled. The funnel 5 is sliced 19 from the bottom towards the top, stopping a variable distance from the top. These are in multiple, even dimensioned slices 19, much like a pie. At the topmost end of the slice 19, stress and fatigue holes 18 are drilled. This eases stress and fatigue when inserting specimen, thus allowing the funnel 5 to have a longer life, although eventually, said funnel 5 would have to be replaced with a new one. A preferred embodiment of the funnel 5 that may be used, but not required, as shown in FIG. 11, is added material 22 on the outside of the funnel 5 and traversing over the neck 20 of the funnel. This added material 22 allows for the funnel 5 longer life.

Figure 14:
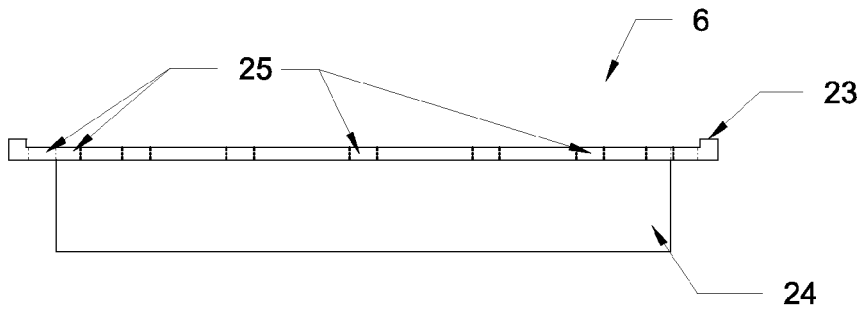
FIG. 14 depicts a side view of the safety valve.
Figure 15:
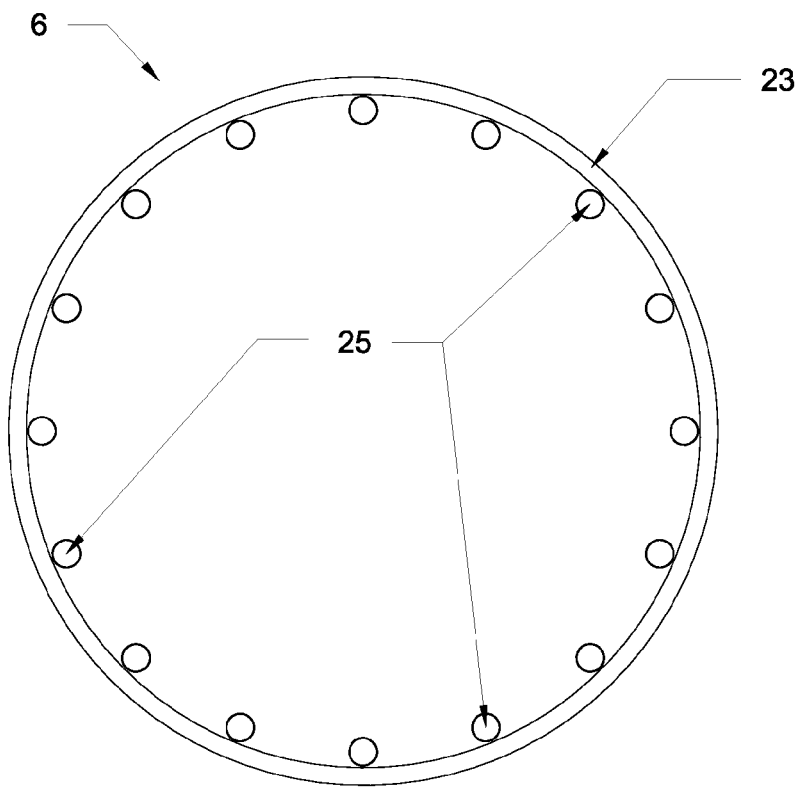
FIG. 15 depicts a top view of the safety valve.
Figure 16:
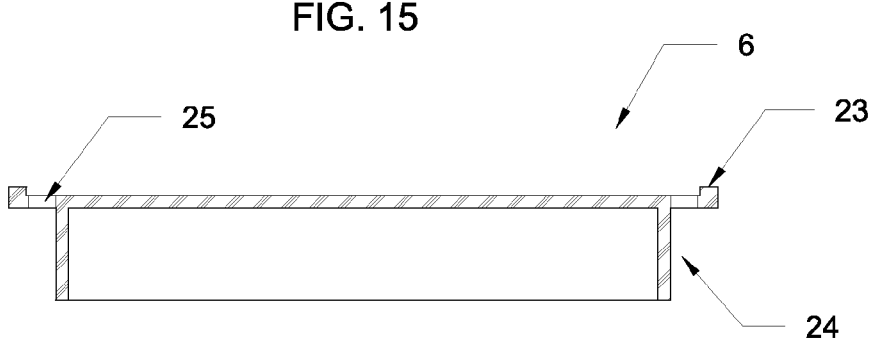
FIG. 16 depicts a section through view of the safety valve.

FIGS. 14, 15 and 16 show the top view, side view and section thru the safety valve 6, respectively.

The safety valve 6 sits on the flange 2 and inside the cap 1. The elevated rim 23 of the safety valve 6 is so that it "sits" within the indent 11 of the cap 1, and then the assembled cap 1 and safety valve 6 are screwed to the flange 2 on the bottom of the invention. Preferred embodiments of the safety valve 6 are the multiple weep holes 25 that allow displacement of air and water from inside the invention out.

Figure 21:
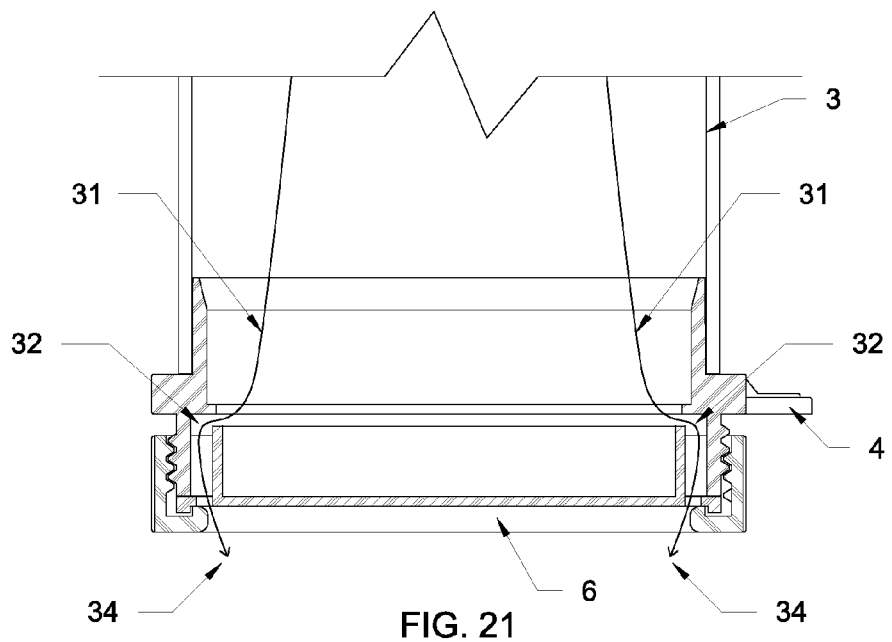
FIG. 21 depicts a section through view of the safety valve assembly of the invention with the embodiments as shown in FIGS. 6, 9 and 16.
Figure 22:
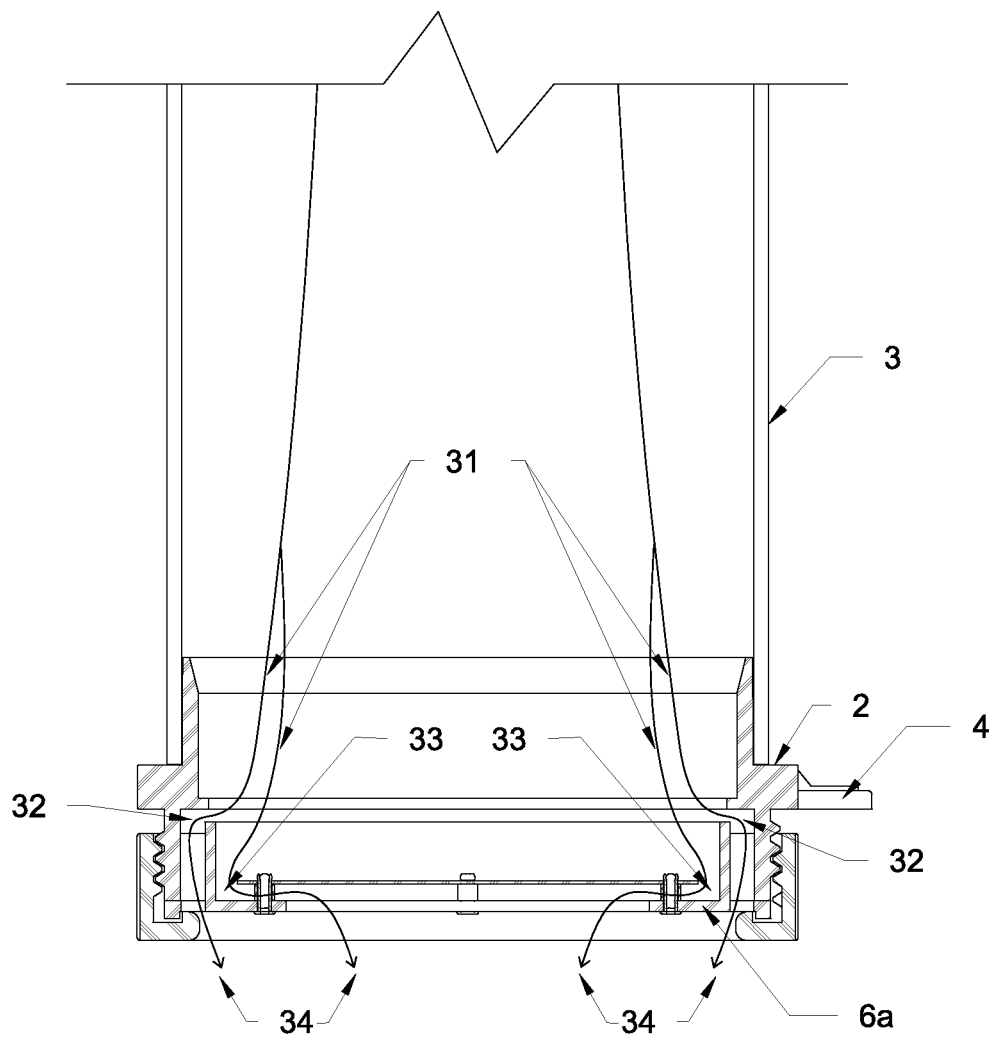
FIG. 22 depicts a section through view of the safety drain valve assembly of the invention with the embodiments as shown in FIGS. 6, 9 and 19.

Another preferred embodiment is the extension 24 of the safety valve 6 that when placed in the flange 2, acts with the inner ring 15 of the flange 2 to deter the spines of the specimen to protrude from the invention, but still allowing the free flow of displaced air and water, as shown in FIGS. 21 and 22.

Figure 17:
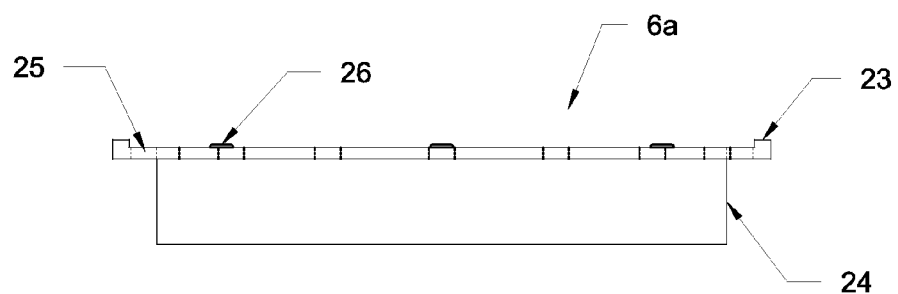
FIG. 17 depicts a side view of the safety drain valve.
Figure 18:
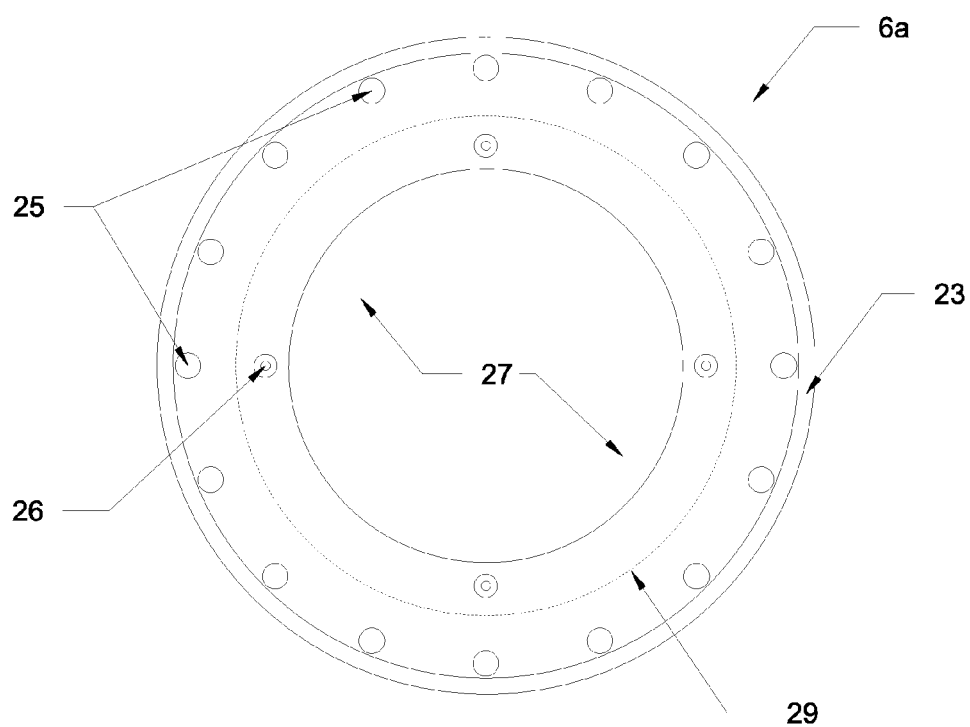
FIG. 18 depicts a top view of the safety drain valve.
Figure 19:
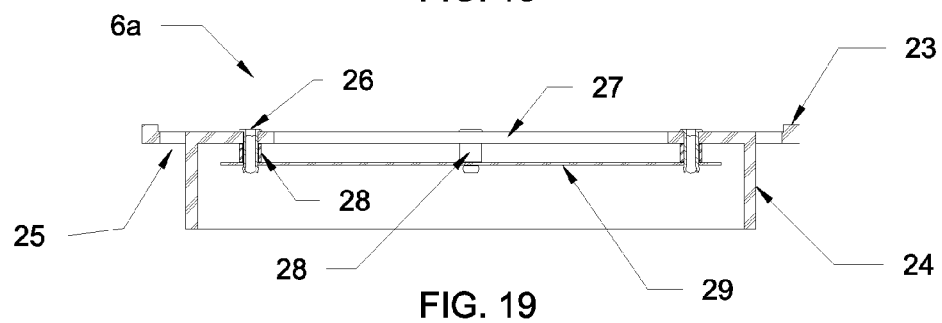
FIG. 19 depicts a section through view of the safety drain valve.

FIGS. 17, 18 and 19 show the top view, side view and section thru the fast draining safety valve 6a, respectively.

Although similar to the safety valve 6, the drain safety valve 6a allows air and water displacement to occur at a higher volume rate, while doing so in less time. The embodiments of the drain safety valve 6a that differ from the safety valve 6 are the additional opening 27 that allows more volume of air and water to be displaced as well as the interior plate 29, which is larger than the additional opening 27, and slightly smaller than the diameter of the safety valve extension 24, and is attached with friction, adhesive, one or more fasteners such as screws, bolts, or rivets, and combinations thereof. The inner plate 29 is offset from the additional opening 27 with the use of either washers 28 or a rigid hollow tube or pipe 28. This offset allows air and water to be displaced from inside the body 3, having to travel at least 2 ninety degrees to exit the invention as shown in FIGS. 21 and 22.

Figure 20:
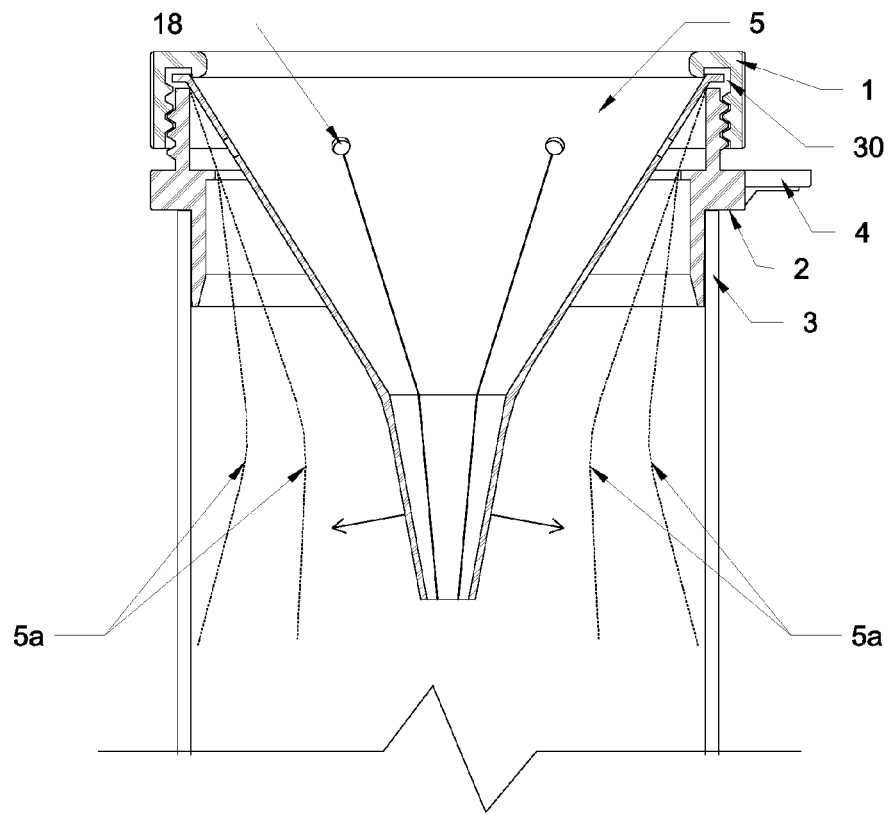
FIG. 20 depicts a section through view of the entry assembly of the invention with the embodiments as shown in FIGS. 6, 9 and 13.

FIG. 20 is a section through showing the cap 1, flange 2 and funnel 5 assembly attached to the body 3 of the invention.

The main embodiment is the body 3 of the invention. The body 3 can be of various materials, either rigid such as plastics or metals, or non-rigid such as a fabric that is qualified as puncture resistant, or a combination of both rigid and non-rigid materials. The flange 2 is attached to the body 3 of the invention with friction, adhesive, one or more fasteners such as screws, bolts, or rivets, and combinations thereof. The funnel 5 is then placed to sit inside the flange 2 with the larger opening at the top of the flange 2. The cap 1 is then screwed on the flange 2, with the larger opening sitting inside the indent 11 of the cap 1, pinching the funnel 5 in place when tightened.

Upon pressing a speared specimen inside the invention through the funnel 5, the funnel will open 5a to allow passage of the speared specimen into the invention as shown. Once the specimen is passed the funnel 5, the funnel 5 will come back to its original shape, thus closing around the shaft of the spear. The action of pulling the spear out of the invention causes the specimen to be stripped off the spear by the bottom 21 of the closed funnel 5.

FIG. 21 is a section view of the bottom portion of the invention, where again the flange 2 is attached to the body 3 of the invention with friction, adhesive, one or more fasteners such as screws, bolts, or rivets, and combinations thereof. Although not necessarily required, lining up the loop 4 of both attached flanges 2 (top and bottom of the body 3) would be preferred. The safety valve 6 or the drain safety valve 6a as shown in FIG. 22, would be placed on the flange 2 so that the extension 24 of the safety valves 6 & 6a is faced towards the inside of the invention. The extension 24, coupled with the inner ring 15 of the flange 2, forces the flow 31 of air and water to make at least two ninety-degree turns 32 to exit the invention. This allows for a free flow of both elements, yet constrain the spines of the specimen from being able to do the same, thus providing safety to the diver.

The manufacture and use of various embodiments of the invention lend themselves to industrial applicability. The making of materials (such as the rigid or non-rigid body), components (such as the molds required to produce the flange, cap, safety valve and drain safety valve), and finally assembling such to achieve the invention represents manufacturing applicability. The use of the invention, to contain harvested venomous and non-venomous marine species represents another application relating to the protection of the harvester as well as the marine environment.

It should be understood that the foregoing relates to exemplary embodiments of the invention and that modifications may be made without departing from the spirit and scope of the invention as set forth in the following claims.

What is claimed is:

1. A marine containment device for containing a marine species, the marine species captured within a body of water, the marine containment device, comprising:
    a body including a first end and a second end;
    a hollow body within said body extending between said first end and said second end;
    an entry in said first end defining an open position and a closed position;
    said open position allowing the marine species into said hollow body;
    said closed position retaining the marine species within said hollow body;
    an interior plate within said hollow body;
    a safety valve exterior to said interior plate;
    a weep hole in said safety valve; and
    said interior plate and said weep hole defining a displacement drain in said second end for displacing the water within said hollow body during said open position and minimizing displacement of the water through said entry; and
    a travel distance in said displacement drain offsetting the exiting water from said hollow body for prohibiting protrusion of the marine species from said hollow body.

2. A marine containment device for containing a marine species as set for in claim 1, wherein said entry includes a funnel defining a wide opening at a top, an angled surface and a small opening at a bottom;
    a plurality of slices extending from said small opening to a topmost end adjacent to said top opening;
    said funnel adapted to expand upon the marine species pushing against said funnel for defining said open position; and
    said funnel adapted to contract upon the marine species traversing said funnel for defining said closed position.

3. A marine containment device for containing a marine species as set forth in claim 2, further including a hole in said funnel adjacent to said topmost end of said plurality of slices; and
    said hole eases stress and fatigue during expanding of said funnel.

4. A marine containment device for containing a marine species as set forth in claim 2, further including a neck in said funnel;
    said neck having an angle change in said funnel; and
    a material plate on an outside of said funnel and over said neck for extending the life of said funnel.

5. A marine containment device for containing a marine species as set forth in claim 2, further including a flange attached to said first end;
    said flange including a center opening and threads;
    a cap having a center opening and threads; and
    said threads of said cap threadably engaging said threads of said flange for securing said funnel between said flange and said cap.

6. A marine containment device for containing a marine species as set forth in claim 5, further including an indented portion in said cap for receiving said funnel and aligning said funnel relative to said cap while threadably engaging said threads of said cap with said threads of said flange.

7. A marine containment device for containing a marine species as set forth in claim 1, wherein said safety valve includes a plurality of weep holes for displacing the water.

8. A marine containment device for containing a marine species, the marine species captured within a body of water, the marine containment device, comprising:
  a body including a first end and a second end;
  a hollow body within said body extending between said first end and said second end;
  an entry in said first end defining an open position and a closed position;
  said open position allowing the marine species into said hollow body;
  said closed position retaining the marine species within said hollow body;
  a displacement drain in said second end for displacing the water within said hollow body during said open position and minimizing displacement of the water through said entry;
  a travel distance in said displacement drain offsetting the exiting water from said hollow body for prohibiting protrusion of the marine species from said body;
  said displacement drain further includes a flange attached to said second end;
  said flange including an inner ring and threads;
  said inner ring of said flange defining a center opening;
  a safety valve including an extension;
  a cap having an inner rim and threads;
  said inner rim of said cap defining a center opening;
  said threads of said cap threadably engaging said threads of said flange for securing said safety valve between said flange and said cap; and
  said inner ring of said flange and said extension of said safety valve causing the water to travel at least two ninety degrees turns to exit said displacement drain.

9. A marine containment device for containing a marine species as set forth in claim 8, further including an indented portion in said cap for receiving said safety valve and aligning said safety valve relative to said cap while threadably engaging said threads of said cap with said threads of said flange.

10. A marine containment device for containing a marine species as set forth in claim 8, wherein said travel distance is defined between said inner ring of said flange and said extension of said safety valve for prohibiting protrusion of the marine species from said body.

11. A marine containment device for containing a marine species, the marine species captured within a body of water, the marine containment device, comprising:
  a body including a first end and a second end;
  a hollow body within said body extending between said first end and said second end;
  an entry in said first end defining an open position and a closed position;
  said open position allowing the marine species into said hollow body;
  said closed position retaining the marine species within the hollow body;
  a displacement drain in said second end for displacing the water within said hollow body during said open position and minimizing displacement of the water through said entry;
  a travel distance in said displacement drain offsetting the exiting water from said hollow body for prohibiting protrusion of the marine species from said body;
  said displacement drain further includes a flange attached to said second end;
  said flange including an inner ring and threads;
  said inner ring of said flange defining a center opening;
  a safety valve including an opening and an extension;
  said opening of said safety valve having a first diameter;
  an interior plate coupled to said safety valve;
  said interior plate having a second diameter;
  said second diameter being greater than said first diameter;
  said interior plate coupled to said safety valve and defining an offset relative to said safety valve for displacing the water from said hollow body;
  a cap having an inner rim and threads;
  said inner rim of said cap defining a center opening;
  said threads of said cap threadably engaging said threads of flange for securing said safety valve between said flange and said cap; and
  said inner plate and said safety valve causing the water to travel at least two ninety degrees turns to exit said displacement drain.

12. A marine containment device for containing a marine species as set forth in claim 11, wherein said travel distance is defined between said interior plate and said safety valve for prohibiting protrusion of the marine species from said body.

13. A marine containment device for containing a marine species, the marine species captured within a body of water, the marine containment device, comprising:
  a body including a first end and a second end;
  a hollow body within said body extending between said first end and said second end;
  an entry in said first end defining an open position and a closed position;
  said open position allowing the marine species into said hollow body;
  said closed position retaining the marine species within said hollow body;
  a safety valve coupled to said second end of said hollow body;
  an extension wall coupled to said safety valve and extending within said hollow body;
  a weep hole in said safety valve;
  said weep hole positioned adjacent and exterior to said extension wall for defining a displacement drain in said second end for displacing the water within said hollow body during said open position and minimizing displacement of the water through said entry; and
  said extension wall and said hollow body defining a travel distance for offsetting the exiting water from said hollow body for prohibiting protrusion of the marine species from said hollow body.

14. A marine containment device for containing a marine species, the marine species captured within a body of water, the marine containment device, comprising:
  a body including a first end and a second end;
  a hollow body within said body extending between said first end and said second end;
  an entry in said first end defining an open position and a closed position;
  said open position allowing the marine species into said hollow body;
  said closed position retaining the marine species within said hollow body;
  a safety valve coupled to said second end of said hollow body;
  an extension wall coupled to said safety valve and extending within said hollow body;
  a plurality weep holes in said safety valve;
  said plurality weep holes positioned adjacent and exterior to said extension wall for defining a displacement drain in said second end for displacing the water within said hollow body during said open position and minimizing displacement of the water through said entry; and said extension wall and said hollow body defining a travel distance for offsetting the exiting water from said hollow body for prohibiting protrusion of the marine species from said hollow body.

\* \* \* \* \*